Figure 1:
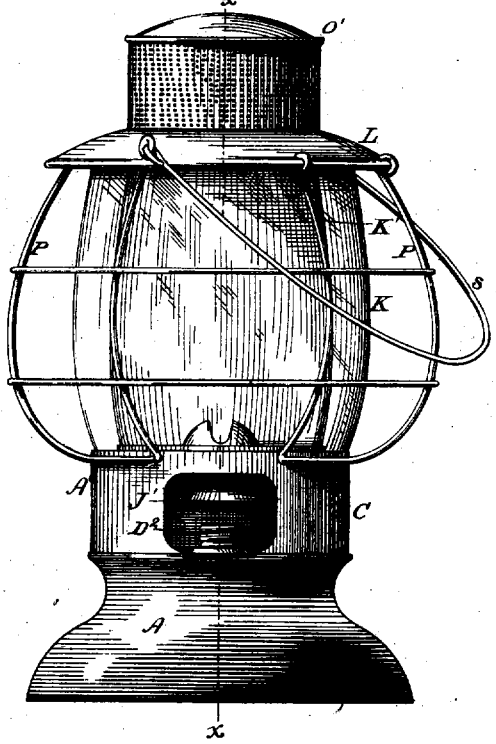

E. F. CASH & A. L BARON.

Assignors of one-third interest to D. RANKIN.

Lantern.

No. 8,502. Reissued Nov. 19, 1878.

*Witnesses:*

Clarence Poole,
R. T. Dyer.

*Inventor:*

Evan F. Cash,
Alfred L. Baron,
by Geo. W. Dyer & Co.
attys.

N. PETERS, PHOTO-LITHOGRAPHER, WASHINGTON, D. C.

UNITED STATES PATENT OFFICE.

EVAN F. CASH AND ALFRED L. BARON, OF BELLAIRE, OHIO, ASSIGNORS OF ONE-THIRD INTEREST TO DAVID RANKIN, OF SAME PLACE.

IMPROVEMENT IN LANTERNS.

Specification forming part of Letters Patent No. 191,401, dated May 29, 1877; Reissue No. 8,502, dated November 19, 1878; application filed November 11, 1878.

*To all whom it may concern:*

Be it known that we, EVAN F. CASH and ALFRED L. BARON, of Bellaire, in the county of Belmont and State of Ohio, have invented a new and useful Improvement in Lanterns; and we do hereby declare that the following is a full and exact description of the same, reference being had to the accompanying drawings, and to the letters of reference marked thereon.

The object we have in view is the construction of a lantern adapted for use with coal-oils of ordinary tests, so constructed that the lantern may be subjected to any violence of motion or exposure to wind without extinguishing the light; and the novelties which constitute our improvement consist, principally, in providing a lantern with two globes, the inner one of which composes the combustion or flame chamber, and the space between the two globes composes the air-chamber for the exclusive supply of air to the interior of the burner in the combustion-chamber, said globes having substantially the same form throughout, whereby the air-chamber between them is at all points of about the same area in cross-section, said globes being relatively of such a size that the capacity of the air-chamber referred to is about the same as the capacity of the combustion or flame chamber; in the combination of the air-chamber, as described, with the combustion-chamber, by means of connecting air-passages to supply air from above to the interior of the burner; in the combination of the elements above named, with other air-passages which supply air from below to the combustion-chamber upon the outside of the burner; in the mode or method of counterbalancing the air-columns; in the construction of a peculiar air-chamber in the upper part of the base, communicating with the interior of the burner; in openings in the sides of the upper part of the base through such air-chamber; and in the construction, combination, and arrangement of the various operative parts, all as more particularly and in detail described.

In order that those skilled in the art may know how to make and use our lanterns, we now proceed to describe the same, having reference to the drawing, making a part of this specification, in which—

Figure 2:
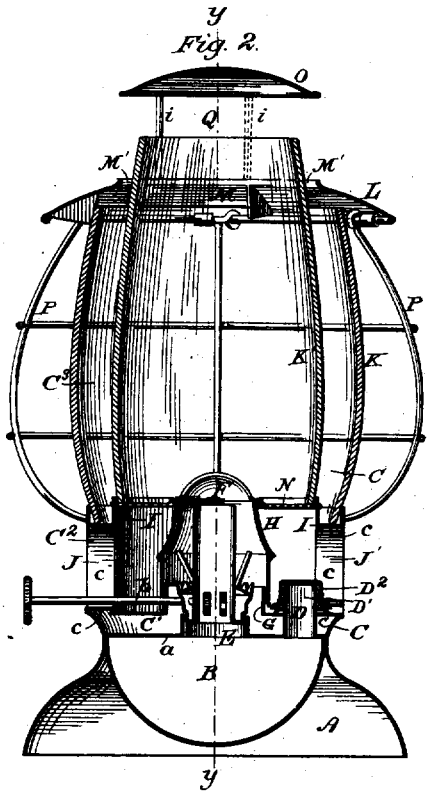
Figure 4:
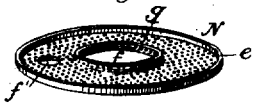
Figure 5:
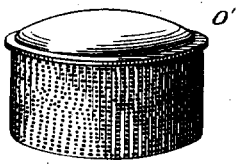
Figure 6:
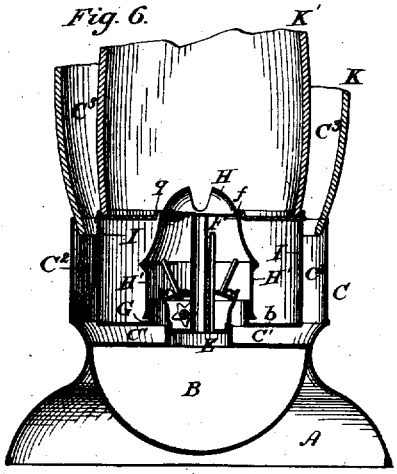
Figure 3:
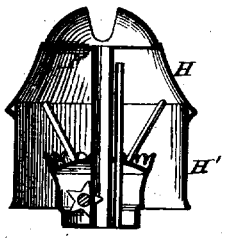

Figure 1 is an elevation of our lantern; Fig. 2, a central vertical section of the same upon the line *x x* of Fig. 1; Fig. 3, a vertical section of the cone and its jacket; Fig. 4, a separate view of the perforated diaphragm or disk; Fig. 5, a separate view of one of the caps, and Fig. 6, a central vertical section of the lower portion of the lantern upon the line *y y* of Fig. 2.

In our lantern, A represents the lower and A′ the upper part of the base. Within the lower base the oil-reservoir B is secured in any proper manner, provided always that there are no openings for air around the oil-reservoir, or, in fact, upon the under side of the base. This oil-reservoir is a close vessel, preferably of metal, with a flat top, with no opening leading into it except that for filling and for the bottom of the burner, hereinafter described.

Placed upon the oil-reservoir is the air-chamber C, which preferably occupies the whole height of the upper base, A, and the space between the globes, and is composed of several distinct portions or divisions. The lower portion, C′, of the air-chamber occupies a space between the top of the oil-reservoir *a* and a diaphragm, *b*, and extends entirely across the interior of the upper base, A′.

A tubular connection, D, for filling the oil-reservoir, extends from such reservoir up through the portion $C^1$ of the air-chamber and through the diaphragm *b*, and terminates in a screw-nozzle, $D^1$, covered with a proper screw-cap, $D^2$. Another tubular connection, E, springs from the center of the top of the oil-reservoir, and is adapted for any suitable close-fitting reception of the bottom of the burner F, so that the lamp-wick shall have convenient entrance into the said oil-reservoir. Another tubular connection, G, also central and around the tube E, and considerably larger, springs from the diaphragm *b*, and is adapted for close fitting with the jacket of the cone H, which preferably is placed over it, so that there is a convenient and closed air-passage between the air-chamber $C^1$ and the interior of the cone around the burner.

The middle portion of the air-chamber $C^2$ is a chamber which extends entirely around the interior of the upper part of the base above the diaphragm *b*, between the walls of such base and an inner wall, I, extending about as high as the base A′, and this chamber is open at the top and the bottom, and in no other places. This portion of the air-chamber has one or more openings, but preferably two openings, J J′, opposite to each other, extending through the walls of such air-chamber, and having walls *c c*, closing all access to the interior of such air-chamber. In one of these openings, J, the nozzle $D^1$ is placed, so as to give convenient access for filling the oil-reservoir, and the ratchet *d* may be placed and operated in the other opening, J′.

It is evident that instead of the construction just described of this portion $C^2$ of the air-chamber, any tubular connection might be made from the portion $C^1$ of the air-chamber with the upper portion, $C^3$, without departing from the spirit of our invention.

The upper portion of the air-chamber, $C^3$, lies between the outer globe, K, and the inner globe, K′, of the lantern. The outer globe, K, and the inner globe, K′, are preferably of the form shown—that is to say, of a little greater diameter a short distance above the bottom than elsewhere, and a little smaller at the top than at the bottom, and are of such size, relatively, that when in position in the lantern the space between the two globes is about equal in capacity to the whole interior of the combustion-chamber, and the distance across the space between the globes will be about the same at all points between them. The globe K fits closely within the top of the upper base, A′, and may have also support by the upper walls, *c c*, of the openings J J′, and extends up to within a short distance of the reflector L, between which and the top of the globe K is a free open space, M.

The inner globe, K′, whose bottom should be of a size to correspond nearly with that of the inner wall, I, fits into a perforated disk, N, having small openings and an upturned flange, *e*, to receive and hold the bottom of the globe K′, which disk rests upon the walls I. In the center of this disk is an opening, *f*, with upturned flange *g*, through which opening the top of the cone passes, and serves to hold the disk, and consequently the globe K′, in position, and also a small opening, *f′*, for the admission of a match for lighting. The office of the openings J J′ is to give convenient means of access for filling the oil-reservoir, and for applying a match for lighting; to supply air around the upper portion of the reservoir to prevent injurious heating; and, in connection with the perforated disk N, to furnish a passage for air into the interior of the combustion-chamber outside of and around the burner, having the effect of cooling the air in the combustion-chamber, particularly at the bottom around the burner and at the sides of such chamber.

This inner globe, K′, extends up through the reflector, with a space, M′, between it and the reflector clear and open, and terminates at a point a little below the cap O, leaving a clear, open space, Q, between the top of said globe and the under side of said cap. The air-chamber C consequently extends from the space M down through the portions $C^2$ and $C^1$ to the interior of the cone. The principal office of the reflector is to prevent the admission of rain or water to the space between the globes, and the cap O performs the same office with regard to the interior of the inner globe.

A wire guard, P, surrounds the outer globe and extends from the upper part of the base to the reflector, which is hinged and provided with a catch.

The cap O rests upon supports *i*, secured to the top of the reflector; or, instead of such cap and supports, a cap, O′, (shown in Fig. 5,) having perforated sides, which rest directly upon the top of the reflector, may be used. The cone H has a jacket, $H^1$, and preferably the two are struck up in one piece. A proper handle, S, for carrying the lantern is secured to the top of the reflector.

The manner of operation of the lantern, supposing it to be in use, is now described; and it is explained, in order to account for the difference between this specification and that of the original Letters Patent, so far as relates to the principle and mode of operation, that by constant and large use of the lantern since the date of the original Letters Patent, and from much experiment, we have become convinced that the original specification was erroneous, defective, and insufficient in the above-named particular.

The lantern being lighted, and in a state of rest, contains in the combustion-chamber and in the space between the globes, on account of their relatively equal capacity, columns of air of about the same volume, which columns, as they are connected by air-passages, naturally balance each other. As the air in the combustion-chamber becomes heated, an upward movement of said column out of this chamber is established, and by the draft of this movement an equal volume of air is drawn from the air-chamber between the globes through the connecting passages and through the interior of the burner into the combustion-chamber, and thus an inflowing movement of air is established, which air enters the space between the globes at its top only. Manifestly the force of the ascending air and the products of combustion is strongest in the center of the combustion-chamber, just above the burner, and where the heat is greatest, and the force is least at the sides and at the bottom of the combustion-chamber, below the top of the burner and below the flame. The draft then through the disk N will be slight, and the volume of air passing through the minute perforations of this disk will be small, and the air which supplies and feeds combustion will be supplied almost, if not entirely, from the air-chamber between the globes.

The result is, that a lantern in a state of rest burns with a steady flame of great brilliancy, and the outer globe is kept so cool as to be incapable of fracture by water falling upon it.

In nearly all the sudden movements to which kerosene-oil lanterns of the ordinary kind are subjected, as well as in nearly all the different directions from which the wind may strike them, the tendency is to unduly raise or depress the column of air within the flame-chamber and the burner, and thereby detach the flame from the wick.

In nearly all the sudden movements to which our lantern, as herein described, may be subjected, as well as in nearly all the different directions from which the wind may strike it, any tendency of the column of air within the flame-chamber and the burner to be unduly raised is resisted by an equal tendency of the column of air in the chamber between the globes to be also raised at the same time and in the same way, the two columns thus pulling about equally in opposite directions, thereby counterbalancing at or near the flame and leaving the combustion unimpaired; and in such movements of the lantern and of the wind, as before mentioned, wherein the air within the flame-chamber and burner would have a tendency to be unduly depressed, such tendency would have no appreciable result, because the column of air in the chamber between the globes would be acted upon at the same time and in the same way, and as the pressure upon the two opposing columns of air is about equal, there is no appreciable movement resulting therefrom in either, and consequently none at the point of combustion, and the result is that the flame is not detached from the wick, as it would be were it not for the aid of the counterbalancing column of air that is inclosed by the outer globe.

The tendency of air to pass upward or downward, through the disk N, into or out of the flame-chamber in these various movements of the lantern and of winds is checked by the small size of the perforations in such disk, and no appreciable quantity passes through.

In these movements of the air-columns the vertical walls of the globes and the uniformity of their distance asunder have a beneficial result, as thereby the columns rise and sink vertically, without disturbing eddies, compression, or obstructions, and are therefore more sensitive in their action.

In these various movements, as when the lantern is in a state of rest, there is the constant presence of a body of air in the openings J J′, which tends to keep the under side of the disk N cool, as well as the open space under it, and prevents undue or dangerous heating of the oil in its reservoir.

The advantages of this lantern may be stated as follows: It may be constructed cheaply, and yet be very durable in use. It is very attractive in appearance, entirely safe, convenient, and easily managed. It may be used for railroad purposes, as well as for all other purposes for which lanterns are intended, and in all uses under every exposure it will be found to produce a clear, smokeless, odorless, and unextinguishable light. By reason of the constant coolness of the outer globe there is no danger of its fracture by exposure to any sort of weather, or to rain or snow or water; and by reason of the large size of the inner globe there is no danger of its breaking from overheating, and it is protected also by the outer globe from rain and water. The space between the globes also serves as a reservoir or storehouse of air, which is well protected from outside violent atmospheric disturbances, whereby a gentle and equable feed of air is supplied to the flame for combustion under all circumstances.

We do not pretend to have been the first to admit air over the top of the globe, and between it and a lamp-chimney to the interior of the burner, to feed and support combustion, as this was done by Coffin, and is shown in his patent of 1861. Neither do we pretend to have been the first to employ two glass chimneys, with an air-chamber between them, open at the top, one of which chimneys was placed inside of the other, and the chambers thus provided were connected under the burner, as such an organism is described in the patent of Blaisdell and Young of 1873. Nor do we pretend to have been the first to construct a lantern with a chamber between the globe and the chimney, for the supply of air drawn from above the globe and into the burner at the same time that other air-currents were admitted from below into the chimney outside of the burner, as this was described by Coffin in 1861; and we disclaim all such inventions, believing that our improvement differs from Coffin's in having two globes of similar form, with a space between them of a capacity about equal to the capacity of the inner globe, said two globes being equidistant from each other at all points, instead of having, like Coffin, a spherical globe of a large size and an ordinary small chimney within it, whereby the capacity of the air-space between the globe and the chimney was several times greater than the capacity of the chimney, and there could be no balancing of air-columns.

We also believe that our improvement differs from that of Blaisdell and Young's, before referred to, who employ two chimneys, one within the other, in a lamp, in this respect: that in said Blaisdell and Young's patent there is not a proper relative capacity of the inner chimney and the space between the chimneys to secure an equilibrium of the air-columns, and neither the chimneys nor the whole structure are applicable to lanterns for ordinary out-of-door uses without additions involving invention.

We are also aware of the Letters Patent granted to Beaufils and Rexroth for a "miner's safety-lantern," September 28, 1869, wherein are shown two cylindrical tubes or chimneys, placed one within the other, for the purpose of admitting air drawn from above down between said tubes or chimneys to feed and support combustion; and we disclaim any invention shown in said Letters Patent, as it differs from our own in not having two globes, and in acting upon the principle of rapid exhaust-air currents wholly, instead of by counterbalancing air-columns, as in our lantern.

In all of these lanterns above disclaimed the flame-chamber is a chimney, whereby great heat and rapid ascending air currents are developed; whereas our flame-chamber is a globe of large size, and thereby contains an air-column which is comparatively inert.

We do not know and do not believe that any person before ourselves ever invented or constructed a double-globed lantern, or a lantern substantially like the one above described in construction and mode of operation.

Having thus described our lantern, its manner of use, and some of its advantages, what we claim as new therein and our invention, for which we desire Letters Patent, is—

1. The globes K and K′, combined to be used in a lantern as outer and inner globes, similar in form, with walls a little curved outwardly, and of slightly less diameter at the top than at the bottom, and of such size, relatively, that when one is placed within the other the space between them shall have about the same capacity as the interior of the smaller globe, substantially as described.

2. In a lantern, the combination of an outer and an inner globe, of substantially the same form, so that the two globes shall be about equidistant from each other at all points, and of such a size, relatively, that the capacity of the space between the globes shall about equal the capacity of the inner globe, substantially as described and shown.

3. In a lantern, the combination of an air-supply chamber between the globes, a combustion-chamber within the inner globe, and connecting air-passages between the two chambers, the two chambers being of about the same capacity, substantially as described and shown.

4. In a lantern, the combination of the air-chamber $C^3$ between the two globes, the air-chamber $C^2$ between the double walls of the upper part of the base, and the air-chamber $C^1$ between the top of the oil-reservoir and the diaphragm above it, said air-chamber being closed except for the entrance of air above the outer globe and for the exit of air into the interior of the cone, substantially as and for the purposes set forth.

5. In combination with the upper base, A, of a lantern and the air-chamber $C^2$, extending around said upper base, the openings J J′ in such upper base, substantially as and for the purposes set forth.

6. In a lantern, the combination of the openings J J′ and the perforated disk N, substantially as set forth.

7. In a lantern, the combination of the base A A′, the oil-reservoir B, and the opening J, extending through the air-chamber $C^2$, without openings into said air-chamber, substantially as and for the purposes set forth.

8. The method of counterbalancing the air-columns in a lantern by a column of air in an air-chamber between the globes and a column of air contained in the combustion-chamber, the two columns being connected by passages leading through the burner, and being of about the same volume, substantially as described.

This specification signed and witnessed this 28th day of October, A. D. 1878.

EVAN F. CASH.
ALFRED L. BARON.

Witnesses:
CHAS. C. CRATTY,
D. B. CRATTY.